(12) United States Patent
Moberg et al.

(10) Patent No.: US 8,181,642 B2
(45) Date of Patent: May 22, 2012

(54) LIGHT ABSORBER DEVICE

(75) Inventors: Arne Moberg, Enskede (SE); Peter Kjaerboe, Stockholm (SE); Henrik Bage, Stockholm (SE); Frederic Telander, Bromma (SE)

(73) Assignee: Soltech Energy Sweden AG, Tullinge (SE)

( * ) Notice: Subject to any disclaimer, the term of this patent is extended or adjusted under 35 U.S.C. 154(b) by 378 days.

(21) Appl. No.: 12/601,926

(22) PCT Filed: Jun. 13, 2008

(86) PCT No.: PCT/SE2008/050715
§ 371 (c)(1),
(2), (4) Date: Nov. 25, 2009

(87) PCT Pub. No.: WO2008/153501
PCT Pub. Date: Dec. 18, 2008

(65) Prior Publication Data
US 2010/0175688 A1 Jul. 15, 2010

(30) Foreign Application Priority Data
Jun. 15, 2007 (SE) ...................................... 0701468

(51) Int. Cl.
*F24J 2/04* (2006.01)
(52) U.S. Cl. ......... 126/674; 126/658; 126/667; 126/671
(58) Field of Classification Search .................. 126/674, 126/643, 658, 661, 667, 671
See application file for complete search history.

(56) References Cited

U.S. PATENT DOCUMENTS

| 2,680,437 | A | * | 6/1954 | Miller ........................... 126/649 |
| 4,099,513 | A | | 7/1978 | Skrivseth |
| 4,122,828 | A | | 10/1978 | DiPeri |
| 4,144,871 | A | | 3/1979 | Porter |
| 4,297,990 | A | | 11/1981 | Allisbaugh |
| 4,313,429 | A | | 2/1982 | McAlaster |
| 4,353,357 | A | | 10/1982 | Nelson |
| 4,437,456 | A | * | 3/1984 | Merrigan ....................... 126/637 |
| 4,478,210 | A | * | 10/1984 | Sieradski ....................... 126/570 |

FOREIGN PATENT DOCUMENTS

SE 517 373 C2 6/2002

OTHER PUBLICATIONS

Written Opinion of the International Searching Authority, corresponding to PCT/SE2008/050715, mailed Oct. 13, 2008.

* cited by examiner

*Primary Examiner* — Alfred Basichas
(74) *Attorney, Agent, or Firm* — Renner, Otto, Boisselle & Sklar, LLP

(57) ABSTRACT

The present invention relates to a light absorbing device which comprises an transparent outer material layer, a space through which air is circulated and heated by light radiation passing through the outer the material layer, a radiation absorbing material layer, and an element which is adapted to divide the space in at least a first subspace, which comprises a first opening, and a second subspace, which comprises a second opening. The air is adapted to flow along a path having an extension from the first opening to the second opening. The path comprises flow resistance reducing means in at least one portion of the space which is adapted to reduce the flow resistance for the gaseous medium when it is guided through said portion of the space.

14 Claims, 2 Drawing Sheets

LIGHT ABSORBER DEVICE

THE BACKGROUND OF THE INVENTION AND PRIOR ART

The present invention relates to a light absorbing device which comprises an at least partly transparent outer material layer, a space through which a gaseous medium is adapted to be circulated and heated by light radiation passing through the outer material layer, a radiation absorbing material layer which is located in connection to said space, and an element which is adapted to divide the space in at least a first subspace, which comprises a first opening, and a second subspace, which comprises a second opening, wherein the gaseous medium is adapted to flow along a path having an extension from the opening in the first subspace to the opening in the second subspace and that said path has an extension such that the gaseous medium only has possibility to be guided from the first subspace to the second subspace via a passage which is located at a lower level in the space than the levels of the first opening and the second opening, and wherein said element has an extension between an upper end abutting an upper edge surface of the space and a lower end which defines a lower level for an upper portion of the first subspace and an upper portion of the second subspace.

With light is meant here not only light visible for the eye but electromagnetic light in general, comprising ultraviolet light and infrared light.

SE 517 373 shows a light absorbing device according to the above. When the radiation absorbing material layer of the light absorbing device is subjected to incident solar radiation, it obtains an increased temperature. The gaseous first medium, which preferably is air, provides a heating when it comes in contact with the warm radiation absorbing material layer in the space. When the air is heated in the space, the air in one of the subspaces obtains a higher temperature than the air in the other subspace. Thus, a thermal unbalance is obtained between the air in the two subspaces and a natural circulation is established through the light absorber. The natural circulation of air is automatically started when the temperature of the air in the light absorber exceeds the temperature of the air located outside the openings of the subspaces and it ceases automatically when the air in the light absorber has dropped to the same or a lower temperature than the air located outside the openings of the subspaces. The air which is located outside the openings of the subspaces may be air which is located inside a building.

Consequently, such a light absorbing device does not need any energy consuming fan for transporting the medium through the space. The operating expenses for the light absorbing device will thus be substantially non-existent. Consequently, the light absorbing device uses a gaseous medium, which is advantageously air. Thus the light absorbing device does not need any conduits which usually are required for transporting a liquid medium. The risk for leakage resulting in water damages is thus eliminated. The light absorbing device may be given a simple construction and be manufactured to a low cost.

U.S. Pat. No. 4,353,357, U.S. Pat. No. 4,144,871 and U.S. Pat. No. 4,099,513 show all examples of light absorbing devices which comprise an internal box-liked space adapted to be through flown by air heated by incident solar radiation. The air is here guided along a more or less labyrinth-shaped path between an inlet opening and an outlet opening. The object of the labyrinth-shaped path is to give the air a low flow velocity and possibility to come in optimal contact with the radiation absorbing material layer inside the space. Thus, the air may be heated to a high temperature before it is guided out through the outlet opening. However, the use of a labyrinth-shaped path results in the drawback that the air obtains an increased flow resistance. In order to force the air through the flow path, energy consuming fans seem to be needed.

SUMMARY OF THE INVENTION

The object of the present invention is to provide a light absorbing device of the initially mentioned kind which has a construction such that a natural circulation of the gaseous medium through the light absorbing device is established at the same time as a substantially optimal quantity of heat energy in the form of warm gaseous medium will be produced.

This object is achieved by the light absorbing device of the initially mentioned kind, which is characterised in that the device comprises flow resistance reducing means adapted to reduce the flow resistance for the gaseous medium when it is guided through said path and that said means comprises that the elongated element has an inclination such that said path provides a successively increased width and thus an increased cross section area in the flow direction of the medium in the upper portion of the first subspace and/or in the upper portion of the second subspace. A minimal flow resistance for a medium is obtained in paths having a somewhat expanding cross section area. Such an expansion of the path is also preferable since the gaseous medium expands and is heated. Advantageously, said path has a successively increased cross section area in the flow direction of the medium in at least one portion of the space. Thus, the flow losses can be kept on a substantially minimal level in this whole portion of the space. Advantageously, said element is elongated. Since the element divides the first subspace and the second subspace, the lower end of the elements defines the highest level for the passage between the first subspace and the second subspace. The lower end of the element ought to be located on a level which is located clearly below the levels of the openings in order to provide a stable natural circulation. The level difference between the lower end of the element and the upper edge surface ought to be at least corresponding to the double diameter of the openings. If the inclined element is provided with parallel sides in connection to the first subspace and the second subspace, a corresponding width increase is provided in the flow direction in both the first subspace and the second subspace. By means of such an inclined element, the start of the natural circulation is facilitated as well as the trans-port of the medium through the whole space. By facilitating the natural circulation of the medium, the produced quantity of heat energy can be increased.

According to a preferred embodiment of the present invention, said elongated element has an inclination to a vertical plane within an angle range of 1°-45°, preferably within an angle range of 10°-30°. Normally, optimal conditions can be achieved within such an angle range in order to reduce the flow resistance optimally.

According to another preferred embodiment of the present invention, the first subspace comprises a lower portion which comprises a part of said path receiving air from the upper portion of the first subspace at a limit line and discharging air to the second subspace via the passage. Consequently, the lower portion of the first subspace is located below the lower end of the element. The path in the lower portion of the first subspace may have an equally large cross section area at the limit line as at the passage. Thus, the cross section area is not at least reduced in this portion. However, the path has advantageously a smaller cross section area in the lower portion of the first subspace at the limit line than at the passage. Thus, the path also expands in the lower portion of the first subspace.

According to another preferred embodiment of the present invention, said flow resistance reducing means comprises at least a guide element which is arranged in at least one portion of the space. Especially, it is required that the medium changes direction in the lower portions of the two subspaces. Inevitably, changes of direction result in flow losses. The application of a suitable guide element in one of these portions results in that the medium can change flow direction in this portion with lower flow losses. The guide element may comprise a plane guiding surface which forms a substantially constant angle to the incident flow direction of the medium. By means of such guide element, the flow losses may be reduced in a simple manner. Alternatively, the guide element may comprise a curved guiding surface which successively changes the flow direction of the incident medium. The medium provides here a smoother change of direction and the flow losses may be reduced further. Several guide elements may be arranged in parallel in said portions in order to further reduce the flow resistance.

According to another preferred embodiment of the present invention, the second subspace has a larger volume than the first subspace. When the space is subjected to light radiation, the air in the larger second sub area achieves a higher temperature than the air in the smaller first subspace. Thus, a thermal unbalance is created between the airs in subspaces such that a natural circulation in a predetermined direction is achieved. Said flow resistance reducing means may comprise that the second opening has a larger cross section area than the first opening. Thus, the flow of the medium through the space is promoted further. The second opening may have a cross section area which is 1.1 to 2.0 times larger than the first opening. During most circumstances, the optimal flow condition is achieved when the openings are dimensioned within this interval. Advantageously, the lower edges of the first opening and the second opening are located at substantially the same level. Thus, an undesired natural circulation of the medium through the space is prevented to occur when the device is not subjected to solar radiation. The openings do not need to be round but they may have an arbitrary shape. They may, for example, be slit-shaped.

According to an embodiment of the present invention, said space is delimited by a side of the radiation absorbing material layer which is turned to the transparent material layer. The circulating gaseous medium is here circulated in a space between the outer material layer and the transparent material layer. The device may here be made very thin. According to a second embodiment, said space is delimited by a side of the radiation absorbing material layer which is turned away from the transparent material layer. The circulating gaseous medium is here circulated in a space which is located behind the radiation absorbing material layer. It is here created a second space between the transparent material layer and the radiation absorbing material layer. Advantageously, this second space comprises air or vacuum. Such a second space constitutes an insulation, during operation of the device, between the cool transparent material layer and the warm radiation absorbing material layer. Another advantage with this embodiment, it is that the circulating gaseous medium does not come in contact with the transparent material layer. Such a contact results generally in a fouling of the inner surface of the transparent material layer. Such a fouling reduces the passage of the sunbeams through the transparent material layer and thus also the heat generating capacity of the device. The inner surface of the transparent material layer needs to be cleaned only in exceptional cases.

BRIEF DESCRIPTION OF THE DRAWINGS

In the following, preferred embodiments of the invention are described as examples with reference to the attached drawings, in which.

DETAILED DESCRIPTION OF PREFERRED EMBODIMENTS OF THE PRESENT INVENTION

Figure 1:
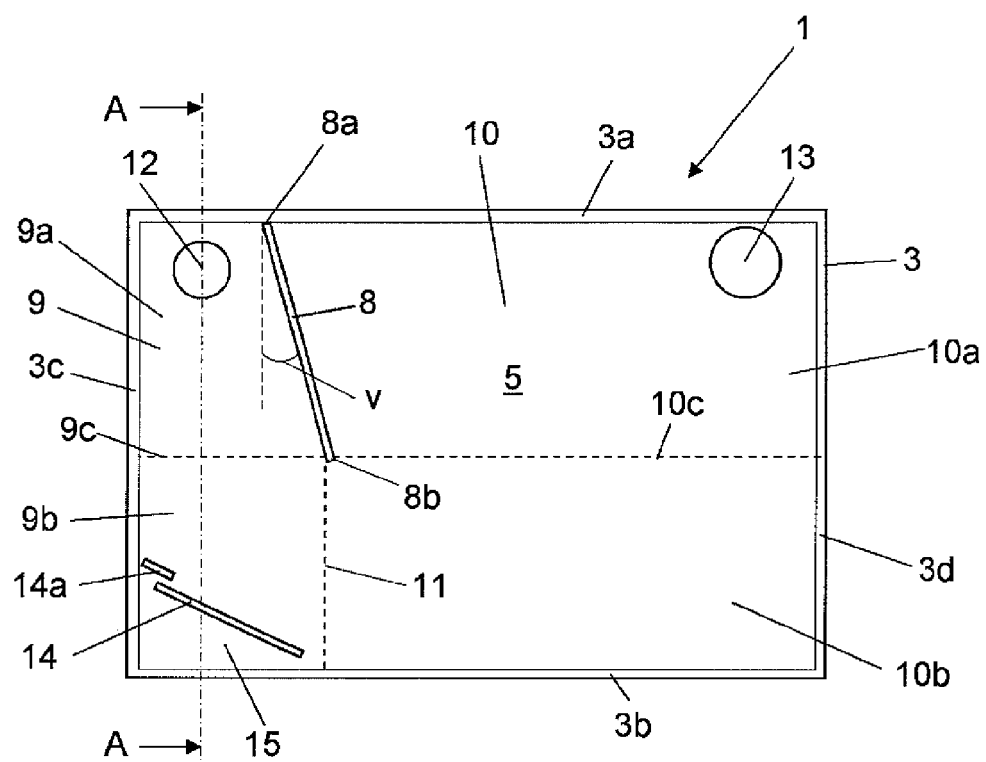
FIG. 1 shows a light absorbing device according to a first embodiment.
Figure 2:
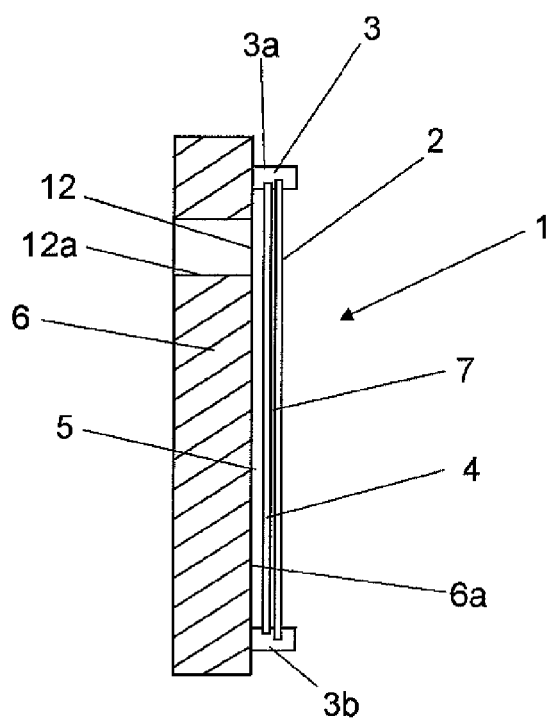
FIG. 2 shows a cross section view of the light absorbing device in FIG. 1 in the plane A-A.

FIGS. 1 and 2 show a light absorbing device 1 according to a first embodiment of the present invention. The light absorbing device 1 comprises an outer material layer of a transparent material which here is exemplified as a plane glass plate 2. However, the outer material layer may be constructed by other materials such as suitable plastic materials. The outer material layer does not need to have a plane outer surface but it may have another shape and be constituted by roofing tiles manufactured by a transparent material. The glass plate 2 is attached in a frame construction 3, which extends around the edges of the glass plates. The frame construction 3 has here a rectangular shape with an upper frame element 3a, a lower frame element 3b and two side frame elements 3c, 3d. Certainly, the frame construction 3 may have another shape.

The light absorbing device 1 comprises a radiation absorbing material layer which may be a plate 4 provided with a black surface. Certainly, other kinds of radiation absorbing material layer may be used such as flexible radiation absorbing material layers. A black radiation absorbing plate 4 has good radiation absorbing properties and it therefore achieves a high temperature then it is subjected to solar radiation. The radiation absorbing plate 4 is attached in the frame construction 3 in an internally position of the glass plate 2. In this case, the frame construction 3 is attached against a wall element 6. A space 5 is formed inside the radiation absorbing plate 4 adapted to be through flown by air. In this case, a surface of the wall element 6 forms a bottom surface 6a of the space 5. When air is guided through the space 5, it comes in contact with an inner side of the radiation absorbing plate 4. An advantage of arranging the space 5 inside the radiation absorbing plate 4, is that the air circulating in the space 5 does not come in contact with the glass plate 2. Thus, the inner surface of the glass plate 2 is prevented from being made dirty. A second space 7 is thus formed between the radiation absorbing plate 4 and the glass plate 2. The second space 7 forms an insulating layer between the glass plate 2 and the radiation absorbing plate 4. Preferably, the second space 7 contains air but it may also contain any other kind of gas or vacuum. Alternatively, it may contain a light transmitting fibre material having heat insulating properties.

An elongated element 8 is arranged in the space 5. The elongated element 8 is adapted to divide the space 5 in a first subspace 9 and a second subspace 10. The elongated element 8 has an extension between an upper end 8a abutting the upper frame element 3a and a lower end 8b which is located at a distance from the lower frame element 3b. The elongated element 8 is dimensioned such that it has a lower surface which is in contact with the bottom surface 6a and an upper surface which is in contact with the radiation absorbing plate 4. Consequently, the elongated element 8 fills out the space 5 vertically. Thereby, air can only pass between the first subspace 9 and the second subspace 10 via a passage 11 which is located below the lower end 8b of the elongated element. The first subspace 9 comprises in connection to the upper frame element 3a a first opening 12 and the second subspace 10 comprises in connection to the upper frame element 3a a second opening 13. The light absorbing device 1 is applied such that the lower edges of the openings 12, 13 are located at substantially the same level. The respective openings 12, 13 are connected with passages 12a, 13a extending through the wall element 6. The passages 12a, 13a are adapted to guide air between an interior of the building and the space 5.

The first subspace comprises an upper portion 9a which is located between the elongated element 8 and the side frame element 3c. The upper portion 8a of the first subspace defines the beginning of a path guiding air through the space 5. In the upper portion 8a of the first subspace, the air is guided substantially straight downwardly from the opening 12. The path has a successively increased cross section area in the flow direction of the air. The elongated element 8 forms an angle v to a vertical line in order to form the path with a successively increased cross section area. The angle v may be within the range of 1° to 45°, preferably within the range of 10° to 30°. Thus, the path provides, in the upper portion 9a of the first subspace, a successively increased width in the flow direction of the air down to a limit line 9c. The limit line 9c marks a transition to a lower portion 9b of the first subspace. The limit line 9c extends perpendicular from a inner surface of the side frame element 3c to the lower end 8b of the elongated element. The passage 11 between the first subspace 9 and the second subspace 10 extends perpendicular from a inner surface of the lower frame element 3d to the lower end 8b of the elongated element. The limit line 9c and the passage 11 define together with the frame element 3b, c the lower portion 9b of the first subspace. The path is equally broad or broader at the passage 11 than at the limit line 9c. Thus, the path obtains a constant cross section area or an increased cross section area in the lower portion 9b of the first subspace.

The lower portion 9b of the first subspace comprises a guide element 14. The guide element 14 has here a straight elongated shape and it comprises a plane guiding surface which forms an angle to the flow direction of the air in the first subspace 9 such that the mainly downwardly flowing air changes direction and is guided in a direction towards the second sub area 10. The ends of the guide elements 14 are arranged at a small distance from the adjacent frame elements 3b, c. Thus, a space 15 defined by the guide element 14 and the frame elements 3b, c in the left lower corner of the frame construction is avoided to be completely closed. A smaller guide element 14a is arranged at the side frame element 3c in a position above the guide element 14 in order to prevent air, flowing downwardly alongside the side frame element 3c, from being guided into the space 15. The second subspace 10 can be divided in an upper portion 10a and a lower portion 10b with a limit line 10c. The limit line 10c extends perpendicularly from an inner surface of the side frame element 3d to the lower end 8b of the elongated element. Due to the inclination of the elongated element 8, the path provides a successively increased width in the upper portion 10a of the second subspace. Advantageously, the outlet opening 13 in the second subspace 10 is larger than the inlet opening 12 in the first subspace 9. The outlet opening 13 may have a cross section area which is 1.1 to 2.0 times larger than the cross section area of the inlet opening 12. The second subspace 10 has a volume which is larger than the volume of the first subspace 9. The volume of the second subspace 10 volume may be 2 to 5 times larger than the volume of the first subspace 9.

When the sun lights on the light absorbing device 1, the solar radiation passes through the transparent glass plate 2 and lights on the radiation absorbing plate 4 such that it is heated. The radiation absorbing plate 4 heats in its turn the adjacent air in the space 5. When the air in the space 5 obtains a higher temperature than the air in the building, the air becomes gradually warmer in the larger second subspace 10 than in the smaller first subspace 9. The thermal unbalance between the subspaces 9, 10 makes that a natural circulation of air is started such that air will be circulated in a path having an extension from the opening 12 in the first subspace 9 to the opening 13 in the second subspace 10. Thereby, air is pressed into the first subspace 9, via the opening 12, and downwardly in the upper part 9a of the first subspace along a path having a successively increased cross section area in the flow direction of the air. When the downwardly flowing air passes the limit line 9c and reaches the lower part 9b of the first subspace, it hits the inclined guide element 14 and changes direction such that it is guided towards the second subspace 10. The guide element 14 forms an angle to the incident air flow such that the air obtains a change of direction with relatively low flow losses.

The air from the first subspace 9 is guided, via the passage 11 to the second subspace 10. The air obtains in the second space 10 a higher and higher temperature and it rises thus upwardly in the second space 10 until it is finally guided out through the opening 13. When warm air is guided out through the opening 13, new cold air is pressed in via the opening 12. Since the supplied air from the building has a lower temperature than the air in the second subspace 10, a lower temperature is established in the first subspace 9 than in the second subspace 10. This temperature difference results in a stable natural circulation of the air being obtained when the light absorbing device is subjected to solar radiation. When the solar radiation ceases, also the air temperature in the space 5 drops. The difference in temperature between the air in the space 5 and the air in the building decreases. This results in that the temperature difference between the air in the first subspace 9 and in the second subspace 10 decreases until the natural circulation of air ceases.

Consequently, the air in the upper part 9a of the first subspace is guided downwardly along a path with a successively increased cross section area in the flow direction of the air. Thus, a minimal flow resistance for the air is obtained at the same time as there is space for the air to expand when it is successively heated. By means of the guide element 14 and a possible increased cross section area in the lower portion 9b of the first subspace, the air obtains a relatively low flow resistance also in this portion 9b. Consequently, the air in the upper part 10a of the second subspace is guided upwardly along a path with a successively increased cross section area in the flow direction of the air. Thus, a minimal flow resistance for the air is obtained at the same time as there is space for the air to expand when it is successively heated. The fact that the opening 13 is larger than the inlet opening 12 also supports the air flow along said path in the space 5. The above described flow resistance reducing means results in the air obtaining a very low flow resistance when it flows along said path in the space 5. Thus, a very stable natural circulation can be obtained also when relatively small temperature differences exist between the air in the first space 9 and in the second space 10. The start of the natural circulation is supported by said flow resistance reducing means at the same time as the air is able to take up the incident solar radiation in a substantially optimal manner.

Figure 3:
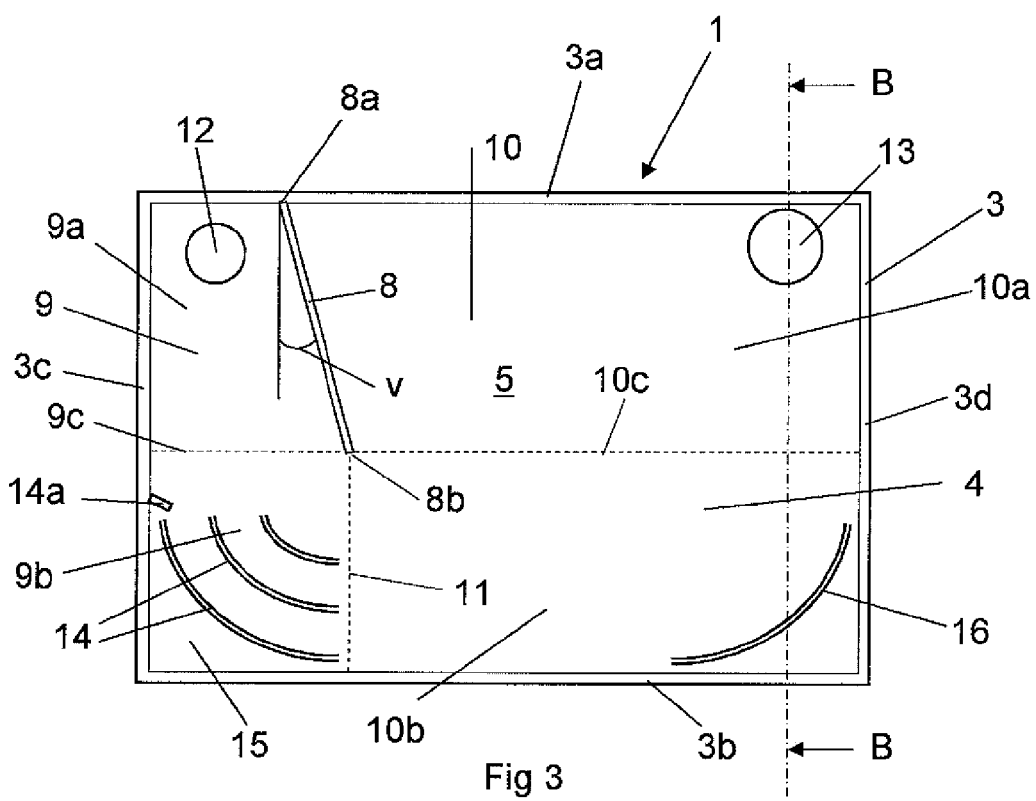
FIG. 3 shows a light absorbing device according to a second embodiment and FIG. 4 shows a cross section view of the light absorbing device in FIG. 1 in the plane B-B.
Figure 4:
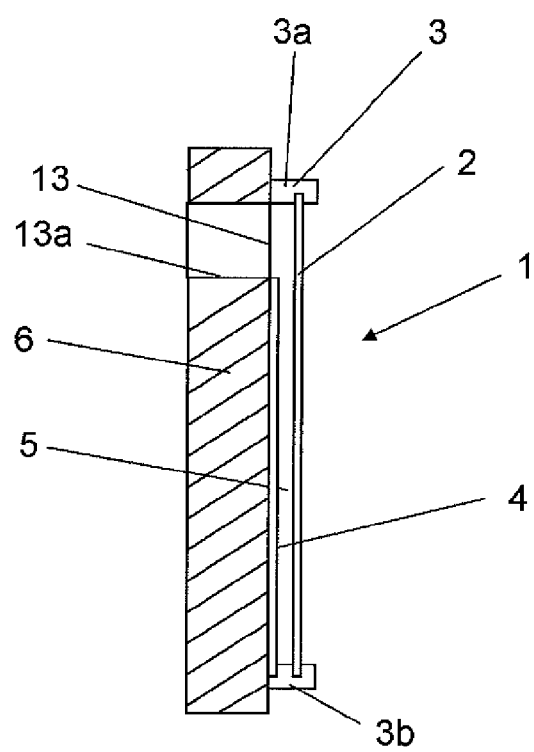

FIGS. 3 and 4 show a light absorbing device according to a second embodiment. This embodiment differs from the one shown above in that the space 5 for circulation of air here is located in front of the radiation absorbing plate 4. Consequently, the circulating air comes here in contact with the surface of the radiation absorbing plate 4, which is turned to the glass plate 2. The radiation absorbing plate 4 forms here a bottom surface in the space 5. In this embodiment, several guide elements 14 have been applied in den lower part 9*b* of the first space. The guide elements 14 have here a curved surface for changing the flow direction of the air successively and to guide it through the passage 11 to the second subspace 10. By means of several such curved guide elements 14, the air obtains a further reduced flow resistance. In this case, a lower portion of the second subspace 10 has also been provided with a guide element 16. This guide element 16 has the task to guide the air which flows towards the side frame element 3*d* upwardly. Thus, the flow resistance of the air in the second subspace 10 can be reduced somewhat. The embodiment showed in the FIGS. 3 and 4 works on the same manner as the embodiment shown in FIGS. 1 and 2. Therefore, we do not make any detailed exposition of the function of this embodiment.

The present invention is not in any way restricted to the embodiments described above in the drawings but may be modified freely within the scope of the claims. The shown light absorbing device is applied on a wall element. However, it may be applied on an arbitrary vertical or inclined element such as a roof element.

The invention claimed is:

1. A light absorbing device which comprises an at least partly transparent outer material layer, a space through which a gaseous medium is adapted to be circulated and heated by light radiation passing through the outer material layer, a radiation absorbing material layer which is located in connection to said space, and an element which is adapted to divide the space in at least a first subspace, which comprises a first opening, and a second subspace, which comprises a second opening, wherein the gaseous medium is adapted to flow along a path having an extension from the opening in the first subspace to the opening in the second subspace and that said path has an extension such that the gaseous medium only has possibility to be guided from the first subspace to the second subspace via a passage which is located at a lower level in the space than the levels of the first opening and the second opening, and wherein said element has an extension between an upper end abutting an upper edge surface of the space and a lower end which defines a lower level for an upper portion of the first subspace and an upper portion of the second subspace, wherein the device comprises flow resistance reducing means adapted to reduce the flow resistance for the gaseous medium when it is guided through said path and that said means comprises that the elongated element has an inclination such that said path provides a successively increased width and thus an increased cross section area in the flow direction of the medium in the upper portion of the first subspace and/or in the upper portion of the second subspace.

2. A light absorbing device according to claim 1, wherein said elongated element has an inclination to a vertical plane within an angle range of 1°-45°, preferably within an angle range of 10°-30°.

3. A light absorbing device according to claim 1, wherein the first subspace comprises a lower portion receiving air from the upper portion of the first subspace at a limit line and discharging air to the second subspace via the passage.

4. A light absorbing device according to claim 3, wherein the path in the lower portion of the first subspace has an equally large cross section area at the limit line as at the passage.

5. A light absorbing device according to claim 3, wherein the path in the lower portion of the first subspace has a smaller cross section area at the limit line than at the passage.

6. A light absorbing device according to claim 1, wherein said flow resistance reducing means comprises at least a guide element which is arranged in at least one portion of the space.

7. A light absorbing device according to claim 6, wherein the guide element comprises a plane guiding surface which forms a substantially constant angle against the incident flow direction of the medium.

8. A light absorbing device according to claim 7, wherein the guide element comprises a curved guiding surface which successively changes the flow direction of the incident medium.

9. A light absorbing device according to claim 1, wherein the second subspace takes up a larger volume than the first subspace.

10. A light absorbing device according to claim 1, wherein said flow resistance reducing means comprises that the second opening has a larger cross section area than the first opening.

11. A light absorbing device according to claim 10, wherein the second opening has a cross section area which is 1,1 to 2,0 times larger than the first opening.

12. A light absorbing device according to claim 10, wherein the lower edges of the first opening and the second opening are located at substantially the same level.

13. A light absorbing device according to claim 1, wherein said space is delimited by a side of the radiation absorbing material layer which is turned to the transparent material layer.

14. A light absorbing device according to claim 1, wherein said space is delimited by a side of the radiation absorbing material layer which is turned away from the transparent material layer.

* * * * *

UNITED STATES PATENT AND TRADEMARK OFFICE
CERTIFICATE OF CORRECTION

PATENT NO. : 8,181,642 B2
APPLICATION NO. : 12/601926
DATED : May 22, 2012
INVENTOR(S) : Moberg et al.

Page 1 of 1

It is certified that error appears in the above-identified patent and that said Letters Patent is hereby corrected as shown below:

Front page, section (73) Assignee, replace "Soltech Energy Sweden AG, Tullinge (SE)" with --Soltech Energy Sweden AB, Tullinge (SE)--.

Specification, Column 2, line 47, replace "the natural circulation is facilitated as well as the trans-port of" with --the natural circulation is facilitated as well as the transport of--.

Signed and Sealed this
Thirty-first Day of July, 2012

David J. Kappos
*Director of the United States Patent and Trademark Office*